J. IMEL.
Wheel-Cultivator.
No. 12,163.
Patented Jan. 2, 1855.
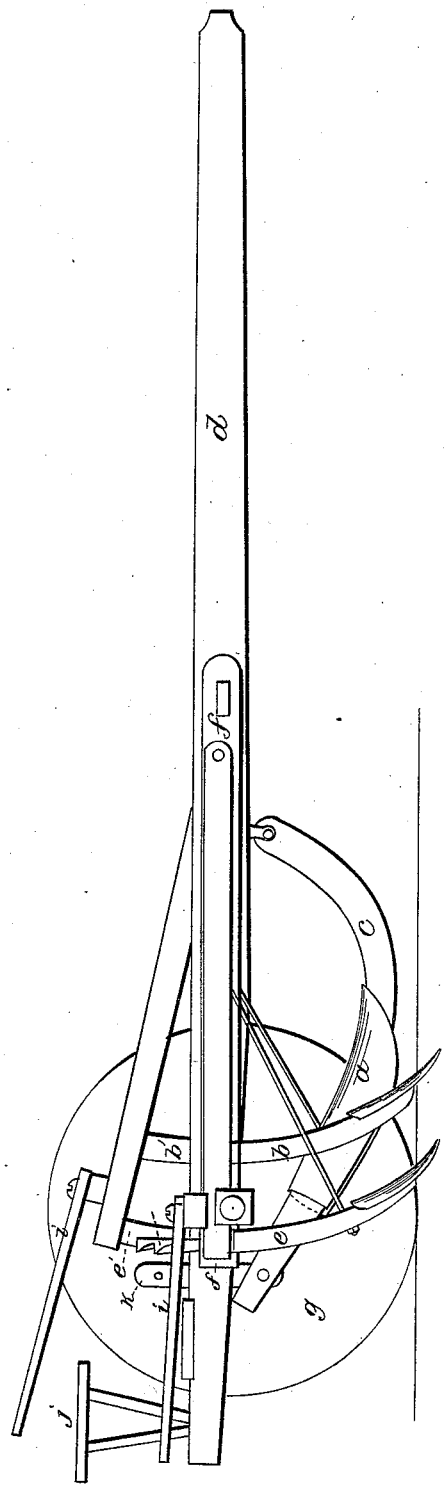

UNITED STATES PATENT OFFICE.

JOHN IMEL, OF LIBERTY, INDIANA.

IMPROVEMENT IN CULTIVATORS.

Specification forming part of Letters Patent No. 12,163, dated January 2, 1855.

*To all whom it may concern:*

Be it known that I, JOHN IMEL, of Liberty, Union county, Indiana, have invented new and useful Improvements in Cultivators; and I do hereby declare the following to be a full, clear, and exact description thereof, reference being had to the annexed drawings, making part of this specification.

My invention consists of a guard or fender, $a$, the object of which is to protect the young sprouting crop from being crushed or bruised beneath the clods turned over by the inner shares, $b\ b'$. This guard $a$ is made of sheet-iron, is somewhat pointed in front, and is bent to the shape of a cylinder of diameter somewhat greater than the width of the plate, and is so attached to the beam $c$ as to present its concave surface downward. The beam $c$ is at front hinged to the under side of the tongue $d$, and terminates behind in a perforated shank, $k$, by which its height can be adjusted.

The shares $b\ b'\ e\ e'$, either on one or both sides of the tongue $d$, may be lifted up from the ground, the share-stocks being for that purpose hinged to a frame, $f$, projecting laterally from the tongue $d$, and supported on running-gear $g$, of which only one wheel and one half frame are visible in the drawing, the other being counterpart. This greatly lessens the danger of the jerking or sudden checking up of the team or the tearing off of the shares by opposing obstacles; and by means of notched post $h$ and bar $i$ one or both sets of shares may be permanently elevated, so as to enable the machine to run freely on its running-gear when required.

$j$ is a driver's seat.

I claim as new and of my invention—

The curved and adjustable guard or fender hinged, as described, to a tongue supported upon running-gear.

In testimony whereof I hereunto set my hand before two subscribing witnesses.

JOHN IMEL.

Witnesses:
GEO. H. KNIGHT,
JOS. S. PARROTT.